No. 669,881. Patented Mar. 12, 1901.
J. W. JAMES.
BICYCLE TRACTION ENGINE.
(Application filed Aug. 20, 1900.)
(No Model.)
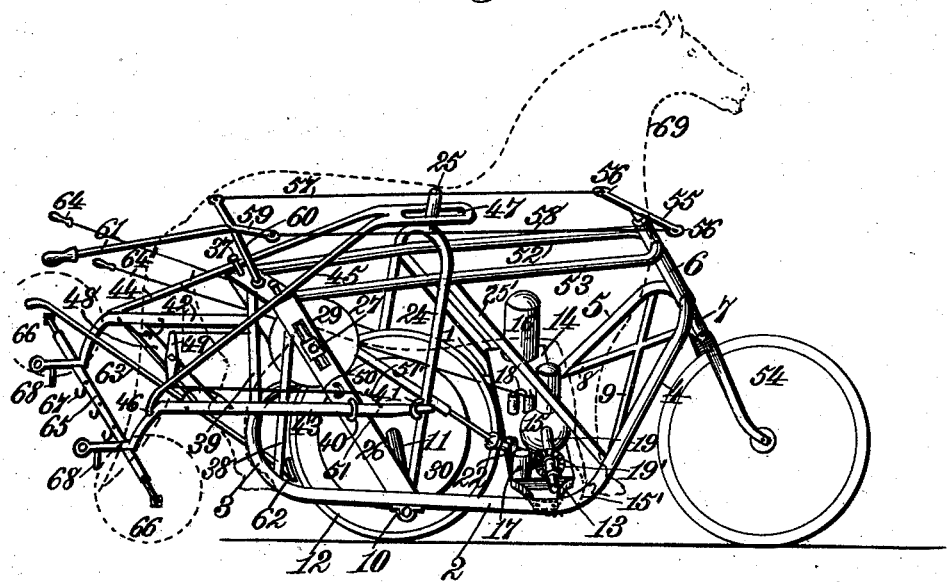
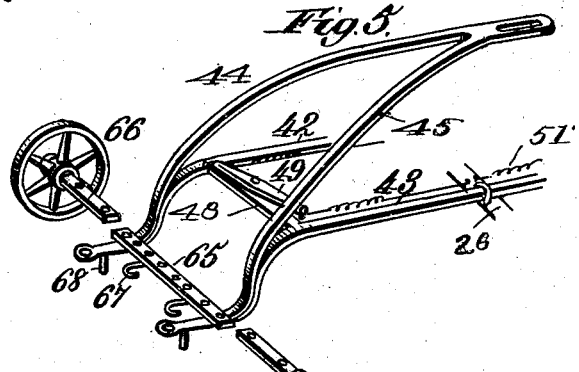
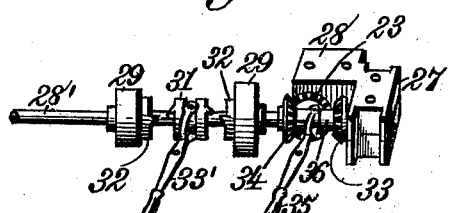
Witnesses.
Robert Everitt
Inventor.
Jack W. James,
By James L. Norris
Atty.
THE NORRIS PETERS CO., PHOTO-LITHO., WASHINGTON, D. C.

UNITED STATES PATENT OFFICE.

JACK WM. JAMES, OF MEMPHIS, TENNESSEE.

BICYCLE TRACTION-ENGINE.

SPECIFICATION forming part of Letters Patent No. 669,881, dated March 12, 1901.

Application filed August 20, 1900. Serial No. 27,461. (No model.)

*To all whom it may concern:*

Be it known that I, JACK WM. JAMES, a citizen of the United States, residing at Memphis, in the county of Shelby and State of Tennessee, have invented new and useful Improvements in Bicycle Traction-Engines, of which the following is a specification.

This invention relates to certain new and useful improvements in traction-engines, more particularly bicycle traction-engines.

The invention aims to construct a bicycle traction-engine propelled by electricity or other power carried by the structure itself and adapted to afford a means of travel from place to place, and more particularly adapted for drawing vehicles of various descriptions, as well as plows, scrapers, harrows, and harvesting machinery, and relying for all of the traction upon a single wheel.

To this end the invention consists of the novel combination and arrangement of parts hereinafter more specifically described, illustrated in the accompanying drawings, and pointed out in the claims hereunto appended.

In the drawings which illustrate the invention, Figure 1 is a perspective view of the engine. Fig. 2 is a detail view of a knuckle-shaft. Fig. 3 is a detail view showing the clutch mechanism. Fig. 4 is a detail view of one of the adjustable levers. Fig. 5 is a similar view of the draft-shafts and their connections.

Referring to the drawings by reference-numerals, 1 2 denote the base-bars of a supporting-frame, connected together at their rear end, as at 3, and at their forward end bent upwardly at an inclination, as at 4 5, and secured to the guide-tube 6 for the steering-post 7. The lower portion of the base of the supporting-frame is substantially U-shaped, while the inclined portion is substantially the shape of an inverted V and is provided lengthwise with a pair of cross braces or studs 8 9.

Journaled in the bearings 10, secured to the bars 1 2, is the shaft 11 for the traction-wheel 12 of any desired diameter and weight and constructed of a suitable metallic material with a tire shrunk thereon, preferably of metal, although the same can be constructed of rubber or compressed fiber, the greater part of the weight of the wheel 12 being preferably in the rim. Arranged at the front of the wheel 12 and secured to the springs 13, carried by the bars 1 2, is a platform 14 for supporting the propelling mechanism, consisting of an engine or motor 15, water-tank 16, air-tank 17, and the batteries or gasolene-tank 18. The reference-numeral 19 denotes the drive-shaft of the engine or motor 15 and carries a fly-wheel 15' and a bevel-gear 19', adapted to mesh with the bevel-pinion 20, carried on the lower end of the knuckle-jointed and telescopic shaft 21, the one end of which is supported in the bearing 22, mounted on the platform 14. The sections of the shaft 21 are connected together in such a manner so as to obtain a longitudinal as well as a rotating movement when telescoping. The upper end of the shaft 21 is provided with a bevel-pinion 23, the function of which will be hereinafter referred to.

Extending upwardly from the shaft 11 is an inverted-yoke-shaped vertical support 24, having a lug 25 on the upper end thereof and braced by the inclined standards 25'. Extending rearwardly from the shaft 11 at an inclination is a frame 26, carrying the sliding bearings 27, provided with an auxiliary bearing 28, in which is journaled the upper end of the knuckle-jointed telescopic shaft 21. Journaled in the bearings 27 is a shaft 28', extending transversely of the frame 26 and carrying a series of friction-pulleys 29, adapted to be brought into frictional engagement with the pulleys 30, mounted upon the shaft 11 of the traction-wheel 12. Preferably but four pulleys upon each of the shafts 11 and 28 are employed and are arranged two at each side of the traction-wheel 12. The pulleys upon the shafts 28' are loosely mounted thereon and of different diameters. The pulleys upon the shaft 11 are also of different diameters. By constructing the pulleys in this manner different rates of speed can be obtained.

The pulleys 29 are fixed upon the shaft 28', when desired, by the clutch-sleeve 31, carried by the shaft 28' and brought into engagement, by means of the lever 33', with a collar 32, secured to one side of each of the pulleys. One of these levers is arranged at each side of the traction-wheel 12 for a pair of pulleys 29 and extend rearwardly of the frame 26. The shaft 28' is operated in both directions by the bevel-gears 33 34. These gears 33 34 are brought into engagement with the beveled pinion 23 of the shaft 21 by the lever 35, suitably connected to the sleeve 36, to which the gears 33 34 are secured. The sleeve 36 is fixed to the shaft to permit of a transverse movement thereof, as well as to revolve therewith. The reference-numeral 37 denotes a pair of adjusting-screws secured to the bearings 27 and operating within the sides of the frame 26 for vertically adjusting the shaft 28' and the pulleys 29, as well as adjusting the telescopic shaft 21. The frame 26 is supported by means of a pair of vertical standards 38 39, secured at their lower end to the base of the supporting-frame.

Secured to each side of the frame 26 and the support 24 are the keepers 40 41, to which are connected the outer ends of the draft-shafts 42 43, which are also supported by means of the flexible metallic hangers 44 45, secured thereto, as at 46, and extending upwardly at an inclination, terminating into a slotted upper end 47 for mounting upon the lug 25 of the support 24. The shafts are suitably braced apart by means of the cross-rod 48, which carries the singletree 49, attached to the frame 26 by means of the spring-tugs 50, as at 51. 51' denotes spring backing-tugs. The hangers 44 45, forming a fork, are adapted to hold the engine steadily in an upright position. The top of the frame 26 is connected, by means of a pair of longitudinally-extending bars 52 53, to the guide-tube 6 of the steering-post 7. These bars form the top of the supporting-frame. The steering-post 7 is formed with a forked lower end, in which is journaled the steering-wheel 54, and the upper end has secured thereto a cross-rod 55, provided with apertured ends 56, in which is connected the one end of the steering chain or cable 57 58. The opposite ends of these chains or cables are connected to a similar cross-rod 59, mounted on a vertical rock-shaft 60, carried by the frame 26 and operated by means of the rearwardly-extending steering-lever 61.

Suitably connected to the base of the supporting-frame is a brake-shoe 62, adapted to engage the tread of the traction-wheel 12 and operated by means of rearwardly-extending brake-lever 63, connected to the brake-shoe 62. Extending rearwardly from the air-tank 17, upon the platform 14, is an air-brake lever 64, which is adapted to connect to, if desired, and operate a suitable air-brake mechanism (not shown) and adapted to be arranged at the front of the traction-wheel 12. Extending rearwardly of the supporting-frame from the platform 14 is a throttle-lever 64' for operating the throttle-valve of the engine. The various levers are constructed in such a manner so they can be adjusted to any length desired.

The reference-numeral 65 indicates an adjustable axle secured to the inner end of the draft-shafts 42 43 and is adapted to carry the wheels 66 for supporting the engine in an upright position when moving from place to place. The axle 65 is provided with a series of hooks 67 for attaching thereto plows, scrapers, &c.; but when drawing a vehicle the wheels 65 are detached and the ends of the shafts 42 43 are attached thereto. The lug-pins 68, formed on the shafts 42 43, may be inserted in the clips on the axles of carriages and wagons or bolted thereto in any desirable manner.

The engine is adapted to be protected from the weather by a covering of suitable material, as indicated in dotted lines at 69, although various forms or styles of coverings may be employed.

The supporting-frame of the engine is constructed in such a manner that the weights of the various parts carried thereby will rest upon the shaft 11 of the traction-wheel 12.

The operation of the device is as follows: The drive-shaft of the motor or engine being operated, motion is imparted to the shaft 21 by means of the gear 19', meshing with the pinion 20. Either of the gears 33 34 is then brought into engagement with the pinion 23, imparting motion to the shaft 28', rotating the fixed pulley 29, and transferring motion to the traction-wheel 12 by means of the frictional engagement of one of the pulleys 30 upon the shaft 11 with the fixed pulley 29 of the shaft 28'. It will be evident that the pulley 29 has been adjusted vertically by means of the adjusting-screws 37 in suitable relation to the alining pulley 30 upon the shaft 11.

It is thought the many advantages of my improved bicycle traction-engine can readily be understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. In a bicycle traction-engine, a supporting-frame, a traction-wheel suitably journaled therein, a steering-wheel, means for steering said wheel, a vertical support, a rearwardly-extending inclined frame, a knuckle-jointed telescopic shaft adjustably connected to said inclined frame, a propelling mechanism for said shaft, and means carried by said inclined frame and operated by said shaft for imparting motion to said traction-wheel.

2. In a bicycle traction-engine, a supporting-frame, a shaft journaled therein, a traction-wheel mounted thereon, a series of friction-pulleys mounted on said shaft, a knuckle-jointed telescopic shaft, a propelling mechanism therefor, and means operated by said telescopic shaft for operating said pulleys imparting thereby motion to said traction-wheel.

3. In a bicycle traction-engine, a supporting-frame, a shaft journaled therein, a traction-wheel mounted thereon, a series of friction-pulleys mounted on said shaft, a knuckle-jointed telescopic shaft, a propelling mechanism therefor, an inclined frame, means carried thereby for adjustably connecting one end of said telescopic shaft thereto, means mounted in said frame and operated by said telescopic shaft for imparting motion to said traction-wheel, and suitable steering mechanism connected to said frame.

4. In a bicycle traction-engine, a supporting-frame, a shaft journaled therein, a traction-wheel mounted thereon, a series of friction-pulleys mounted on said shaft, a knuckle-jointed telescopic shaft, a propelling mechanism therefor, an inclined frame, means carried thereby for adjustably connecting one end of said telescopic shaft thereto, means mounted in said frame and operated by said telescopic shaft for imparting motion to said traction-wheel, suitable steering mechanism connected to said frame, and means for reversing the movement of said wheel.

5. In a bicycle traction-engine, a supporting-frame, a shaft carried thereby, a traction-wheel mounted thereon, a knuckle-jointed telescopic shaft, propelling mechanism for said telescopic shaft, vertically-adjustable means operated by said telescopic shaft for operating said wheel, a steering mechanism, and a cover for said engine.

6. In a bicycle traction-engine, a supporting-frame, a traction-wheel journaled therein, a propelling mechanism, a knuckle-jointed telescopic shaft operated by said propelling mechanism, means operated by said telescopic shaft for imparting motion to said wheel, means for reversing the movement of said wheel, a steering mechanism connected to said frame and a cover for said engine.

7. In a bicycle traction-engine, a supporting-frame, a shaft journaled therein and provided with a series of pulleys of different diameters, a traction-wheel mounted on said shaft, a vertical support connected to said shaft, a rearwardly-extending inclined frame secured at one end to said shaft, a shaft 28' mounted in said inclined frame and provided with a suitable series of pulleys adapted to frictionally engage with the pulleys upon the shaft of the supporting-frame, means for fixing said pulleys to said shaft 28', means for vertically adjusting said shaft 28', a knuckle-jointed telescopic shaft, propelling mechanism therefor, means carried by said shaft 28' and engaged by said telescopic shaft for operating said shaft 28' imparting motion thereby to said traction-wheel and steering mechanism connected to said supporting-frame.

8. In a bicycle traction-engine, a supporting-frame, a shaft journaled therein and provided with a series of pulleys of different diameters, a traction-wheel mounted on said shaft, a vertical support connected to said shaft, a rearwardly-extending inclined frame secured at one end to said shaft, a shaft 28' mounted in said inclined frame and provided with a suitable series of pulleys adapted to frictionally engage with the pulleys upon the shaft of the supporting-frame, means for fixing said pulleys to said shaft 28, means for vertically adjusting said shaft 28', a knuckle-jointed telescopic shaft, propelling mechanism therefor, means carried by said shaft 28' and engaged by said telescopic shaft for operating said shaft 28' imparting motion thereby to said traction-wheel, steering mechanism connected to said supporting-frame, brake mechanism for said wheel, a pair of shafts connected to said vertical support and inclined frame, and suitable levers connected to said propelling mechanism, substantially as described.

9. In a traction-engine, a pair of draft-shafts, spring-tugs connecting said shafts to the engine-frame, keepers for supporting the forward end of said shafts, and spring backing-tugs suitably connected to said shafts.

10. In a traction-engine, a pair of draft-shafts yieldingly connected to the frame of the engine, and a fork secured at one end to said shafts and at its opposite end suitably connected to the engine-frame for retaining the same in an upright position.

11. In a traction-engine, a pair of yielding draft-shafts, and an adjustable axle connected to the rear end of said shafts and carrying a pair of detachable wheels.

12. In a traction-engine, a supporting-frame, a shaft journaled therein and provided with a series of pulleys of different diameters, a heavy-rimmed traction-wheel mounted on said shaft, a vertical support connected to said shaft, a rearwardly-extending inclined frame secured at one end to said shaft, a shaft 28' mounted in said inclined frame and provided with a suitable series of pulleys adapted to frictionally engage with the pulleys upon the shaft of the supporting-frame, means for fixing said pulleys to said shaft 28, means for vertically adjusting said shaft 28', a knuckle-jointed telescopic shaft, propelling mechanism therefor, means carried by said shaft 28' and engaged by said telescopic shaft for operating said shaft 28' imparting motion thereby to said traction-wheel, steering mechanism connected to said supporting-frame, adjustable levers connected to said propelling mechanism, brake mechanism arranged in suitable relation to said traction-wheel, an adjustable operating-lever connected thereto, a pair of draft-shafts yieldingly connected to said vertical support, an inclined frame, a fork connected to said shafts, a singletree carried by said shafts, a cross-bar connected to said shafts, an adjustable axle secured to said shafts, hooks connected to said shafts and a pair of lugs carried by said shafts.

In testimony whereof I have hereunto set my hand in presence of two subscribing witnesses.

JACK WM. JAMES.

Witnesses:
C. PLASSARA,
LIZZIE LEFTWICH.